US012744596B2

(12) United States Patent
Tao

(10) Patent No.: US 12,744,596 B2
(45) Date of Patent: Sep. 22, 2026

(54) LIFI MODULE, A MOBILE DEVICE COMPRISING THE LIFI MODULE AND A METHOD OF INITIATING HANDOVER OF THE USER DEVICE

(71) Applicant: SIGNIFY HOLDING B.V., Eindhoven (NL)

(72) Inventor: Haimin Tao, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 375 days.

(21) Appl. No.: 18/686,902

(22) PCT Filed: Aug. 23, 2022

(86) PCT No.: PCT/EP2022/073484
§ 371 (c)(1),
(2) Date: Feb. 27, 2024

(87) PCT Pub. No.: WO2023/025803
PCT Pub. Date: Mar. 2, 2023

(65) Prior Publication Data

US 2024/0380486 A1 Nov. 14, 2024

(30) Foreign Application Priority Data

Aug. 27, 2021 (WO) ................ PCT/CN2021/115009
Sep. 28, 2021 (EP) .................................... 21199503

(51) Int. Cl.
*H04B 10/00* (2013.01)
*H04B 10/11* (2013.01)

(52) U.S. Cl.
CPC .................................. *H04B 10/11* (2013.01)

(58) Field of Classification Search
CPC .... H04B 10/11; H04B 10/1149; H04B 10/116
See application file for complete search history.

(56) References Cited

U.S. PATENT DOCUMENTS 10,693,557 B1 * 6/2020 Ayotte ............... H04N 21/2146
11,012,869 B1 * 5/2021 Kwatra ............. H04B 10/1149
(Continued)

FOREIGN PATENT DOCUMENTS

CN 106452508 A 2/2017
CN 112153186 A 12/2020
(Continued)

OTHER PUBLICATIONS

Sanusi, Jaafaru, et al., "Handover in Hybrid Lifi and Wifi Networks," 15th International Conference On Electronics Computer and Computation (ICECCO 2019) (6 Pages).
(Continued)

*Primary Examiner* — Agustin Bello

(57) ABSTRACT

A LiFi module for operatively connecting to a WiFi communication module supporting both Wi-Fi and Li-Fi connections is disclosed. The LiFi module comprising an optical front end, OFE, and a connection circuit for communicatively connecting the OFE to the WiFi communication module. The connection circuit comprises a switching component electrically connected to a LiFi signal strength detector and configured to enable or disable a connection between the OFE and the WiFi communication module, under control of the LiFi signal strength detector; and the LiFi signal strength detector electrically connected to the switching component and a receive path of the OFE and configured to detect a strength of an optical signal received at the receive path of the OFE and to control the switching component based on the detected strength of the optical signal.

15 Claims, 5 Drawing Sheets

(56) References Cited

U.S. PATENT DOCUMENTS

2017/0207851 A1* 7/2017 Zeng .................... H04B 10/116
2017/0339769 A1* 11/2017 Wennemyr ........... H04B 10/116
2019/0261239 A1* 8/2019 Wang .................. H04W 36/302
2020/0195342 A1* 6/2020 Rapaport ................ H04L 27/36
2020/0195343 A1* 6/2020 Solanki .............. H04B 10/1149
2020/0204212 A1* 6/2020 Fawcett ............... H04B 10/116
2020/0382958 A1* 12/2020 Wang .................... H04W 12/06
2020/0412449 A1* 12/2020 Zhang ................... G01S 7/4815
2021/0195720 A1* 6/2021 Delame .................. B64D 47/02
2022/0224412 A1* 7/2022 Rooymans ............ G01S 1/7032
2022/0255634 A1* 8/2022 Hara ...................... H04B 10/85
2022/0256406 A1* 8/2022 Van Wageningen ......................... H04B 10/1149
2022/0303004 A1* 9/2022 Taniguchi .............. H04B 10/11
2022/0321217 A1* 10/2022 Van Wageningen ......................... H04B 10/1143
2022/0337314 A1* 10/2022 Berner ................... H04B 10/11
2022/0360984 A1* 11/2022 Hara .................... H04B 10/116
2022/0385361 A1* 12/2022 Dominguez-Gonzalez ................ H05B 47/195
2023/0090182 A1* 3/2023 Salas Moreno ...... H04B 10/116 370/331
2023/0111629 A1* 4/2023 Van Wageningen ......................... H04B 10/1129 398/118
2023/0179299 A1* 6/2023 Van Wageningen ......................... H04B 10/114 398/106
2023/0179300 A1* 6/2023 Germe ............... H04B 10/1149 398/130
2023/0198616 A1* 6/2023 Bluschke ........... H04B 10/1129 398/115
2023/0198618 A1* 6/2023 Van Wageningen ......................... H04B 10/1143 398/130
2023/0198628 A1* 6/2023 Linnartz .............. H04B 10/116 398/130
2023/0208519 A1* 6/2023 Haas .................... H04B 10/114 398/118
2023/0224038 A1* 7/2023 Bluschke ............. H04B 10/116 398/118
2023/0275660 A1* 8/2023 Wendt .................. H04B 10/116 398/172
2023/0283374 A1* 9/2023 Khalid ................... H04B 10/69 398/172
2023/0308176 A1* 9/2023 Van Wageningen ......................... H04B 10/1149
2023/0337068 A1* 10/2023 Van Wageningen ......................... H04W 36/0038
2024/0014900 A1* 1/2024 Wendt .................. H04B 10/116
2024/0072893 A1* 2/2024 Van Wageningen ......................... H04B 10/114
2024/0380486 A1* 11/2024 Tao ........................ H04B 10/11
2025/0088271 A1* 3/2025 Bluschke .............. H04W 76/14
2026/0089680 A1* 3/2026 Gummadi ............. G01S 5/0009

FOREIGN PATENT DOCUMENTS

CN 112821947 A 5/2021
JP 2021051900 A 4/2021
WO 2021048231 A2 3/2021

OTHER PUBLICATIONS

Zubow, Anatolij, et al., Hy-Fi: Aggregation of Lifi and Wifi Using MIMO in IEEE 802.11, 2021 IEEE 22nd International Symposium On a World of Wireless, Mobile and Multimedia Networks (Wowmom) (9 Pages).

Wu, Xiping, et al., "A Novel Handover Scheme for Hybrid Lifi and Wifi Networks," IEEE 2020, (5 Pages).

Ashimbayeva, Aigerim, et al., "Hard and Soft Switching for Indoor Hybrid VLC/RF Systems," 2017 IEEE 11th International Conference On Application of Information and Communication Technologies (AICT), IEEE 2017 (5 Pages).

URL: https://www.cisco.com/c/en/us/td/docs/wireless/controller/technotes/80211r-ft/b-80211r-dg.html, "802.11R BSS Fast Transition Deployment Guide," First Published Jul. 6, 2016, Last Retrieved On Feb. 26, 2024 (11 Pages).

URL: https://en/wikipedia.org/widi/service_set_(802.11_Network), Last Retrieved Feb. 26, 2024, (5 Pages).

* cited by examiner 20
21
22
23
24
25
26
27
28
200
201
202
203
204
S1
S2
S3
K1
K2

LIFI MODULE, A MOBILE DEVICE COMPRISING THE LIFI MODULE AND A METHOD OF INITIATING HANDOVER OF THE USER DEVICE

CROSS-REFERENCE TO PRIOR APPLICATIONS

This application is the U.S. National Phase application under 35 U.S.C. § 371 of International Application No. PCT/EP2022/073484, filed on Aug. 23, 2022, which claims the benefit of International Application No. PCT/CN2021/115009, filed on Aug. 27, 2021 and European Patent Application No. 21199503.0, filed on Sep. 28, 2021. These applications are hereby incorporated by reference herein.

TECHNICAL FIELD

The present disclosure generally relates to the field of wireless communication, and more specifically, to a LiFi module, a mobile device comprising the LiFi module and a method of initiating handover of the user device.

BACKGROUND

Nowadays, an increasing number of devices are connect to the Internet, most wirelessly. This places the conventional wireless communication technologies making use of Radio Frequency, RF, technologies under much pressure. The reason is twofold. In the first place, the RF spectrum is becoming much congested; besides, there are areas where RF wireless communication is not permitted or does not fit well.

The recently developed LiFi technology is a wireless communication technology which utilizes light to transmit or communicate data between devices, over for example visible light, ultraviolet, and infrared spectrums.

Wireless LiFi communication may be advantageous over wireless RF communication in various aspects. For example, the light spectrum as used in LiFi is much wider compared to the RF spectrum; it offers higher data rates, and is usable in areas susceptible to electromagnetic interference such as aircrafts. Moreover, communication over light supports data densities that are significantly higher than in RF, due to the almost unlimited bandwidth of the visible/invisible light spectrum.

On the other hand, LiFi communication has limited coverage as light cannot penetrate through for example walls. Besides, a majority of devices currently available are not compatible with the LiFi technology as they use hardware only for WiFi networking.

Based on the above, it is more desirable to use both WiFi and LiFi technologies in combination with each other, allowing users to experience the advantages of both WiFi and LiFi communications.

A proposed solution for using WiFi and LiFi concurrently requires a combiner at the upper layer, that is, at TCP/IP layer, to make use of both WiFi and LiFi network interfaces, or make use of a MIMO chip and sending signal via both RF and LiFi signal path. Such a solution deals with communication between two devices with MIMO technique and mixed use of RF and optical frequencies.

In another conventional solution, a LiFi module is designed as an integral part of a WiFi chip, in which a signal needed for making a selection between the WiFi network and the LiFi network comes from the MAC layer. This signal is from the digital domain and based on Received Signal Strength Indicator, RSSI, computed inside a WiFi chip. To make use of this MAC signal, an additional connection between an Optical Front End, OFE, and the WiFi chip is needed.

According to another known system, an Access Point, AP is capable of connecting both WiFi and LiFi, so does a user terminal device. In this case, a handover between the LiFi and WiFi networks happens within the same network and there is no roaming or handover from one LiFi AP another WiFi AP or vice versa. This handover may be referred to as Intra-AP handover as it involves only a physical, PHY, layer handover.

In recent developments, 802.11 WiFi based LiFi system has been proposed, which enables the possibility of combining LiFi with the existing WiFi network. The advantages of using WiFi chips for LiFi communication comprise the reuse of the rich WiFi network management and security protocols and resources.

For convenience considerations, a well-designed WiFi based LiFi system allows a LiFi front-end to remain transparent to the upper layer WiFi protocols, such that existing mechanisms such as fast roaming can also be reused. In this way, LiFi network becomes an integral part of wireless access network, together with existing WiFi network, in for example a building.

US2020/195342A1 discloses a WLAN Li-Fi transceiver comprising a Wi-Fi device and Analog Front End. Para. 101 and 102 discloses that MAC controller 420 configures WLAN transceiver to communicate over Wi-Fi instead of over Li-Fi if Li-Fi signal quality is unacceptable. MAC controller 420 generates selection signal 424 for disconnecting between Wi-Fi RF module 408 and RF/Li-Fi converter 412, and connecting between Wi-Fi RF module 408 and Wi-Fi antenna interface 416.

SANUSI JAAFARU ET AL: "Handover in hybrid LiFi and WiFi networks" (2019 Dec. 10) provides an overview concept of hybrid handover in LiFi/WiFi networks. It discloses the concept of soft handover and various QoS parameters including RSSI are considered in the hybrid handover.

ASHIMBAYEVA AIGERIM ET AL: "Hard and soft switching for indoor hybrid VLC/RF systems" (2017 Sep. 20) is dedicated to analysis of hard switching (HS) and soft switching (SS) methods for hybrid VLC/RF sys-tems. It demonstrates that SS outperforms HS when the power is optimally shared between the VLC and RF links.

FIG. 1 schematically illustrates a communication system 10 deployed with both LiFi and WiFi networks. The communication system 10 may be a Local Area Network, LAN, comprising a LAN Switch 11, a WiFi access point 12, AP, and two LiFi APs 13 and 14 connected to the LAN Switch 11. The LiFi APs 13 and 14 respectively have a coverage area 15 and 16 indicated by solid triangles, and the WiFi AP has a coverage area 17 indicated by a dashed triangle.

It is seen from FIG. 1 that a LiFi AP has a relatively small coverage area 15 and 16, therefore blind spots may present between coverage areas of two LiFi APs. In contrast, WiFi signals which are widely present in commercial buildings can achieve a broader coverage 17, though the throughput of WiFi may be significantly slower than LiFi due to interference.

Due to the above facts, a user device operating in a network environment as illustrated in FIG. 1 may have to handover between the WiFi and LiFi networks from time to time. In an office environment, a user may need to move from one room to another while having an online meeting. With the LiFi network, a connection link may be temporary lost if the user enters or passes through a blind area.

Disconnecting from a LiFi AP and then connecting to a WiFi AP can take several seconds, which will cause a bad user experience.

Therefore, there is a genuine need for a method of seamless handover between the LiFi and WiFi network so as to provide improved user experience in the WiFi based LiFi network.

SUMMARY

In a first aspect of the present disclosure, there is presented a LiFi module for operatively connecting to a WiFi communication module supporting both Wi-Fi and Li-Fi connections, the LiFi module comprising an optical front end, OFE, for transmitting and receiving data via an optical medium and a connection circuit for communicatively connecting the OFE to the WiFi communication module, the connection circuit comprising:

- a switching component electrically connected to a LiFi signal strength detector and configured to enable or disable a connection between the OFE and the WiFi communication module, under control of the LiFi signal strength detector; and
- the LiFi signal strength detector electrically connected to the switching component and a receive path of the OFE and configured to detect a strength of an optical signal received at the receive path of the OFE and to control the switching component based on the detected strength of the optical signal.

The present disclosure is based on the insight that seamless transition between a LiFi network and a WiFi network may be realized by using only one wireless link for data communication by making use of a LiFi module operating together with a WiFi communication module supporting dual antenna connection.

The connection circuit of the LiFi module for connecting the LiFi module to the WiFi communication module comprises a switching component, which operates under control of a LiFi signal strength detector, or simply a signal strength detector to enable or disable a connection between an OFE of the LiFi module and the WiFi communication module based on a strength of an optical signal detected by the LiFi signal strength detector. Seamless handover between the LiFi network and the WiFi network is thereby realized, depending on availability of the LiFi network as indicated by the strength of the optical signal detected by the LiFi signal strength detector of the LiFi module.

In comparison with the prior art technology which relies on enabling the WiFi and LiFi connection at the same time for data communication and therefore requires complex protocol at the TCP/IP layer to combine the RF and optical data paths and two baseband chips, the LiFi module of the present disclosure remains simple in terms of circuit design and does not need any modification to the existing TCP/IP protocols.

In comparison with the prior art technology where a signal needed for making a selection between the WiFi network and the LiFi network comes from the MAC layer and therefore requires extra connection between the OFE and a WiFi chip, the optical signal used in the present disclosure is an analogue signal generated locally inside the OFE. As a result, the LiFi module communication remains fully independent from the WiFi module which makes the LiFi module "universal", i.e., the LiFi module can work with any standard off-the-shelf WiFi communication modules supporting dual antenna connection without extra connectors.

In an example of the present disclosure, the switching component comprises a first switch and a second switch, a control terminal of the first switch is connected to a first output terminal of the LiFi signal strength detector, and a control terminal of the second switch is connected to a second output terminal of the LiFi signal strength detector.

The LiFi signal strength detector for detecting the optical signal outputs two control signals for controlling the two switches separately. The two switches operate to ensure smooth transition in a so-called "make before break" fashion, which means that a connection with one network is established prior to a connection with the other network is broken, thereby preventing interruption of connection.

In an example of the present disclosure, the signal strength detector is configured to output an enabling signal at its second output signal and then output a disabling signal at its first output terminal after a period of delay, when the detected strength of the optical signal is lower than a threshold value; the first switch is configured to disable the connection between the OFE and the WiFi communication module, in response to the disabling signal received at its control terminal from the first output terminal of the LiFi signal strength detector; and the second switch is configured to enable a connection between the WiFi communication module and a radio frequency, RF, antenna, in response to the enabling signal received at its control terminal from the second output terminal of the LiFi signal strength detector.

When the detected strength of the optical signal is lower than a threshold value indicating that a user is near an edge of the LiFi coverage, the RF antenna of the WiFi network is enabled by the second switch. In this way, the WiFi communication module can prepare to connect to the WiFi network, for example by way of a WiFi access point, AP, in a coverage area of the RF antenna and prepare for fasting roaming.

In practice, the first switch operates to disable the connection between the OFE and the WiFi communication module slightly later, allowing a certain amount of "overlap" time between the WiFi network and the LiFi network. It thereby ensures that the WiFi network is connected before the LiFi network is disconnected, in the "make and break" way, which allows a smooth transition from the LiFi network to the WiFi network.

Furthermore, when the connection between the OFE and the WiFi communication module is disabled, the first switch may be further configured to enable a connection between the WiFi communication module and a further RF antenna.

The WiFi communication module is therefore connected to two antennas, operating at the same or different frequencies, thereby allowing more communication resources.

It can be contemplated by those skilled in the art that it is also possible to connect the WiFi communication module to a load such as a 50 Ohm terminator, to disable the connection to the WiFi communication module controlled by the first switch.

In an example of the present disclosure, the LiFi signal strength detector is configured to output an enabling signal at its first output terminal and then to output a disabling signal at its second output signal after a period of delay, when the detected strength of the optical signal is higher than a threshold value; the first switch is configured to enable the connection between the OFE and the WiFi communication module, in response to the enabling signal received at its control terminal from the first output terminal of the LiFi signal strength detector; and the second switch is configured to disable a connection between the WiFi communication module and a RF antenna and to enable a connection between the WiFi communication module and a 50 Ohm terminator, in response to the disabling signal received at its control terminal from the second output terminal of the LiFi signal strength detector.

This relates to a scenario of handover from the WiFi network to the LiFi network. When the user enters a LiFi coverage area, detected strength of the optical signal is higher than a threshold value. The signal strength detector therefore outputs a control signal to the first switch, which enables the connection between the OFE and the WiFi communication module. The second switch is also controlled by the signal strength detector to disconnect the RF antenna from the WiFi communication module later.

A smooth handover between the LiFi and WiFi network and a seamless connectivity is thereby achieved by way of the LiFi module operating together with the WiFi communication module which supports both WiFi and LiFi connections.

In a further example of the present disclosure, the first switch and the second switch are single pole double throw switches.

These readily available switches can be conveniently used to implement the connection circuit of the LiFi module. The cost of the LiFi module is kept low and the implementation simple.

In an example of the present disclosure, the LiFi module further comprises a RF-LiFi converter connected between the OFE and the first switch of the connection module and configured to perform frequency conversion between RF band and LiFi optical baseband.

The RF-LiFi converter operates to up or down convert RF signals, of for example 2.4G, 5 GHz, at connection ports of the WiFi communication module to optical baseband frequencies, which are then interfaced with the OFE.

In an example of the present disclosure, a third switch is connected between the RF-LiFi converter and the first switch of the connection module and configured to separate transmit and receive signals from the WiFi communication module.

As the OFE communication module operates in full-duplex while the WiFi communication module operates in half-duplex, the third switch functions together with an RF detector to separate TX and RX signals from the WiFi communication module by detecting RF signal on the TX path.

A second aspect of the present disclosure provides a wireless communication module arranged for providing network service to both a WiFi network and a LiFi network connected to a same LAN, comprising the LiFi module according to the first aspect of the present disclosure and a WiFi communication module operatively connected to the LiFi module and supporting both WiFi and LiFi connections. The WiFi communication module comprises a first connection port and a second port, the first connection port arranged for being switched between a RF antenna and a terminator, the second connection port arranged for being switched between the OFE of the LiFi module and a second RF antenna or a terminator, under control of the LiFi signal strength detector of the LiFi module.

The LiFi module of the present disclosure may be used in a user device. In addition to comprising the LiFi module according to the first aspect of the present disclosure, the user device further comprises a WiFi communication module supporting both WiFi and LiFi connections and operatively connected to the LiFi module, the connection between the OFE of the LiFi module and the WiFi communication module is enabled or disabled under control of the signal strength detector of the LiFi module.

Such a user device can handover between a WiFi network and a LiFi network seamlessly and thereby provides improved user experience in terms of network connectivity.

A third aspect of the present disclosure provides method of initiating handover of a user device between a WiFi network and a LiFi network both connectable to the user device and both connected to a same Local Area Network, LAN, the user device comprising the LiFi module according to the first aspect of the present disclosure, the user device further comprising a WiFi communication module supporting WiFi and LiFi connections respectively at two connection ports, the method performed by a control software routine of the WiFi communication module of the user device and comprising the steps of:

- detecting a state change at one of the connection ports of the WiFi communication module; and
- initiating handover between the WiFi network and the LiFi network by using a fast roaming procedure.

In initiating handover between a WiFi communication network and a LiFi communication network using for example fast roaming, it is very important for the WiFi module to know when the switching action between the two networks should take place. The LiFi module according to the first aspect of the present disclosure, when operating together with a WiFi communication module, gives an indication to the WiFi communication module when a state change happens at one of the connection ports, under control of the signal strength detector of the LiFi module.

The WiFi module, upon detecting that the state change has happened, will notice that it's time to start or initiate the handover procedure. As the fast roaming is accomplished in very short time, typically around 40 ms, the user device is successfully connected to a new network, before the connection with the current network is broken, realizing seamless handover between the networks.

In an example of the present disclosure, wherein the user device is connected to the LiFi network, the step of detecting comprises detecting that a WiFi beacon message is received at a second connection port of the WiFi communication module; and the step of initiating comprises initiating handover from the LiFi network to the WiFi network.

When the user device is accessing the LiFi network, the WiFi module is able to receive a WiFi beacon message as a result that the user device is about to loss connection with the LiFi network, for example due to the user device being at an edge of the LiFi network. At this moment, the handover from the LiFi network to the WiFi network is initiated.

Specifically, in an example of the present disclosure, a WiFi beacon message is received at a second connection port of the WiFi communication module as a result of a connection between the second connection port of the WiFi communication module and a RF antenna being enabled, in response to an enabling signal received at a control terminal of the second switch from the second output terminal of the signal strength detector of the LiFi module.

When the user device is about to loss connection with the LiFi network, the signal strength detector notices the situation and controls the second switch to enable the connection between the second port of the WiFi communication module and the RF antenna, thereby allowing the WiFi communication module to receive the WiFi beacon message.

It requires no direct communication between the LiFi module and the WiFi communication module, except for the two connection port.

In an example of the present disclosure, the user device is connected to the WiFi network, the step of detecting comprises detecting that a LiFi beacon message is received at a first connection port of the WiFi communication module; and the step of initiating comprises initiating handover from the WiFi network to the LiFi network.

This relates to the scenario when the user is accessing the WiFi network and moves to the coverage area of the LiFi network, which means that the WiFi communication module should now initiate the handover to the LiFi network from the WiFi network.

In an example of the present disclosure, a LiFi beacon message is received at a first connection port of the WiFi communication module as a result of a connection between the first connection port of the WiFi communication module and the OFE being enabled, in response to an enabling signal received at a control terminal of the first switch from the first output terminal of the signal strength detector of the LiFi module.

Again the state change is triggered by the signal strength detector of the LiFi module, allowing fast roaming to be initiated at the right time.

In an embodiment of the present disclosure, an indicator is comprised in the WiFi beacon message and the LiFi message to distinguish between the WiFi network and the LiFi network.

The indicator may be a special code for identifying a LiFi AP inserted into an appropriate field of the beacon message, allowing the user device to determine which network is to becoming reachable.

In a fourth aspect of the present disclosure, a computer program product is provided, comprising a computer readable storage medium storing instructions which, when executed on at least one processor, cause the at least one processor to carry out the method according to the third aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
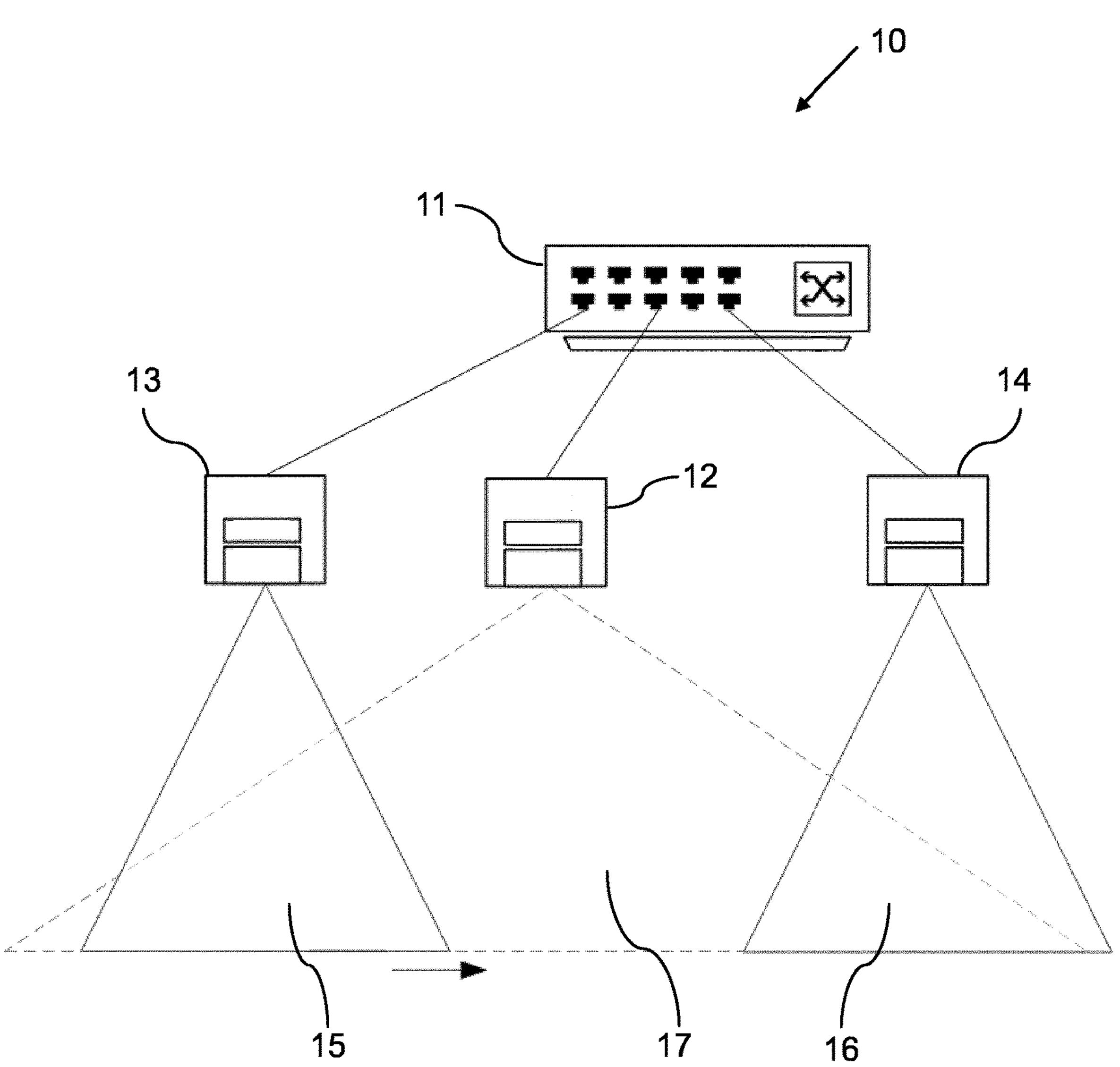
FIG. 1 schematically illustrates a communication system deployed with both LiFi and WiFi networks.

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

In the following description, the terms "handover", "handoff" and "roaming" are used interchangeably, and the terms "user device" and "EP" are also used interchangeably.

Seamless handoff between a WiFi network and a LiFi network is realized by using the LiFi module as proposed by the present disclosure. An application scenario of the LiFi module may be a user device such as a laptop or a mobile phone, which may also be referred to as an Endpoint, EP, deployed in a Local Area Network, LAN.

The LAN may be an Extended basic service set (Extended BSS) comprising a plurality of BSSs including a LiFi AP and a WiFi AP. The LiFi AP and the WiFi AP are independent of each other and connected both to the same LAN. The LiFi AP may also be a module detachably connected to the WiFi AP, while the two APs function independently of each other. In other words, the LiFi AP and the WiFi AP may be physically packaged together, or even on a same PCB, but are logically two sperate APs connected to the same LAN.

Both the LiFi AP and the WiFi AP implement IEEE 802.11r, which is an amendment to the IEEE 802.11 standard permitting continuous connectivity aboard wireless devices in motion, with fast and secure client transitions from one BSS or AP to another one in a nearly seamless manner. Switching or transition from one AP to another is also known as handoff or roaming.

802.11r introduces a new concept of roaming where an initial handshake with a new AP is done before a client, i.e., the EP or user device roams to the target AP, which is called Fast Transition, FT. The initial handshake allows the client and APs to do the Pairwise Transient Key, PTK, calculation in advance. These PTK keys are applied to the client and the AP after the client does the reassociation request or response exchange with new target AP.

The FT in accordance with 802.11r may be referred to as a "make before break" procedure. Specifically, a FT originator, which may be an EP or user device, when still being connected to a current AP, determines that it needs to transition to a new or target AP. The FT originator then exchanges Authentication-Request and Authentication-Response messages with the target AP before exchanging Reassociation Request and Reassociation Response messages with the same target AP. A successful reassociation occurs only when a time between the Authentication-Request and the Reassociation Request does not exceed the Reassociation Deadline Time.

Therefore, it is very important that a WiFi chip of the EP performing the transition or switching action from one AP to the other AP knows the moment to initiate the switch to the other network.

The LiFi module as proposed by the present disclosure operates together with a dual antenna WiFi communication module to realize smooth and seamless handoff between the LiFi and WiFi networks.

Figure 2:
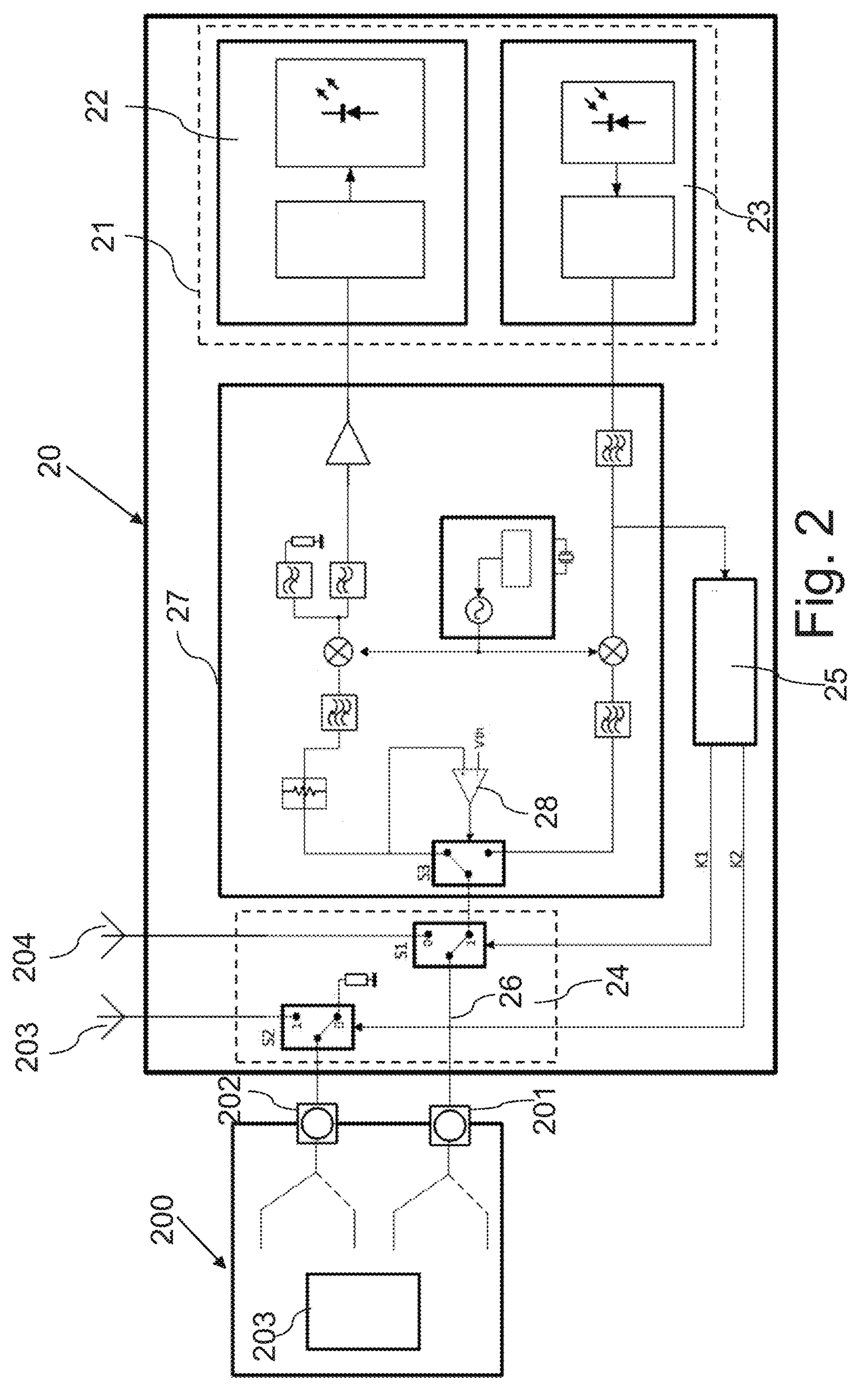
FIG. 2 schematically illustrates a block diagram of a LiFi module in accordance with the present disclosure.

FIG. 2 schematically illustrates a block diagram of a LiFi module 20 in accordance with the present disclosure. The LiFi module 20, which is referred to as an analogue front end in some cases, is suitable for operating together with an existing WiFi communication module 200 supporting both WiFi and LiFi connections.

The WiFi communication module 200 may be constructed in a popular M.2 module form factor, which enables easy connection to a mother board of a user device, via for example a PCIe interface. The WiFi communication module 200 has two connection ports 201 and 202, which means it supports dual antennas. A WiFi chip 205 of the WiFi communication module 200 is configured to perform fast roaming between the WiFi network and the LiFi network in corporation with operation of the LiFi module 20.

The LiFi module 20 comprises an optical front end 21, OFE, which comprises a transmit path 22 and a receive path 23 respectively arranged for transmitting and receiving data via an optical medium, such as visible light, ultraviolet, and infrared spectrums.

The transmit path 22 of the OFE 21 comprises a driver and a light transmitting device which may be for example a vertical-cavity surface-emitting laser, VCSEL, or a Lighting Emitting Diode, LED. The receive path 23 of the OFE 21 comprises a light receiving device, such as a photodiode, and a transimpedance amplifier, TIA.

The LiFi module 20 further comprises a connection circuit for communicatively connecting the OFE 21 to one of the connection ports of the WiFi communication module 200. In the example as illustrated in FIG. 2, a connection 26 between the OFE 21 of the LiFi module 20 and the connection port 201 of the WiFi communication module 200 via the connection circuit may be enabled or disabled.

The connection circuit comprises a switching component 24 and a LiFi signal strength detector or simply signal strength detector 25. The switching component 24 is electrically connected to the signal strength detector 25 and configured to enable or disable the connection 26, which is a communication connection, between the OFE 21 and the WiFi communication module 200, under control of the signal strength detector 25.

The signal strength detector 25 is electrically connected to the switching component 24 and a receive path 23 of the OFE 21 and configured to detect a strength of an optical signal received at the receive path 23 of the OFE and to control the switching component 24 based on the detected strength of the optical signal.

The switching component 24 comprises a first switch S1 and a second switch S2, respectively controlled by a first control signal K1 and a second control signal K2 output by the signal strength detector 25. That is, a control terminal of the first switch S1 is connected to a first output terminal of the signal strength detector 25, and a control terminal of the second switch S2 is connected to a second output terminal of the signal strength detector 25.

The two switches S1 and S2 may be for example single pole double throw, SPDT, switches which operate together to control routing of communication signals from the WiFi communication module 200: either to the OFE 21 of the LiFi module 20 or to a RF antenna 203, and optionally to a further RF antenna 204, depending on the detected optical signal strength.

Specifically, the first switch S1 is controlled by the first control signal K1 to switch the first connection port 201 of the WiFi communication module 200 between a position 1 of being connected to the OFE 21 and a position 0 of being connected to the further RF antenna 204. It can be understood that the output terminal at position 0 of S1 connecting to the RF antenna 204 may also be terminated with a 50 Ohm load (not shown). In this case, the WiFi communication module 200 operates only in one RF band through the RF antenna 203.

The second switch S2 is controlled by the second control signal K2 to switch the second connection port 202 of the WiFi communication module 200 between a position 1 of being connected to the RF antenna 203 and a position 0 of being terminated with a 50 Ohm load R1.

Due to the fact that signals at the connection ports of the WiFi communication module 200 are radio frequency signals, the LiFi module 20 further comprises a RF mixer for down/up converting the RF signals transmitted via the connection port 201 of the WiFi communication module 200, and then interfacing with the OFE 21 of the LiFi module 20.

As the OFE 21 is a full-duplex module while the WiFi communication module 200 operates in half-duplex, the LiFi module 20 further comprises an RF detector 28 and a third switch S3, which function together to separate TX and RX signals from the WiFi communication module 200 by detecting RF signals on the TX path.

Operation of the LiFi module 20 is detailed hereafter.

The signal strength detector 25 measures a strength of an optical signal received via the receive path 23 of the LiFi module 20, indicating whether a user device comprising the LiFi module 20 is in a LiFi coverage area or not.

Depending on a result of comparison between the measured strength of the received optical signal and a predefined threshold value, the signal strength detector 25 output two control signals K1 and K2 for controlling the first switch S1 and the second switch S2, respectively and separately.

As an example, the signal strength detector 25 may output a control signal having a high level "1" at one of its output terminal and a further control signal "0" at the other output terminal, when the measured strength of the received optical signal is higher than the threshold value. When a control signal is high "1", the switch being controlled is connected to position 1; when the control signal is low "0", the switch is connected to position 2.

It can be contemplated by those skilled in the art that the above example is not limitative to the implementation of the present disclosure. In practice other ways of controller may be defined.

In a steady state operation mode of the user device comprising the LiFi and WiFi communication modules 20 and 200, either a RF connection or an optical connection is active, and the other medium is disabled, so as to enable the WiFi chip processor 205 in the WiFi communication module 200 to detect state transition or state change, which will be used by the user device to initiate fast roaming.

The user device is connected to a LAN comprising a LiFi AP and a WiFi AP both connected to the same LAN.

It is assumed that the first switch S1 is currently at position 1 and the switch S2 at position 0, that is, the connection between the WiFi communication module 200 and the OFE 21 of the LiFi module 20 is enabled. At this time, the user device is connected to the LAN via the LiFi AP. When the user device moves towards an edge of the LiFi coverage area, a strength of the optical LiFi signal detected by the signal strength detector 25 starts to drop and the becomes lower than a threshold value.

In this case, the second switch S2 is controlled by the control signal K2 received at the input terminal of the second switch S2 from the signal strength detector 25 to switch to position 1, enabling a connection between the RF antenna 203 and the WiFi communication module 200 via the connection port 202. In this way, the WiFi communication module 200 can establish contact with a WiFi AP in a coverage area of the RF antenna 203 and prepare for fasting roaming.

At the same time, the user device is still associated with a LiFi AP via the connection port 201 and by way of a signal path through the first switch S1. As soon as the WiFi chip 205 notices that a WiFi AP is accessible, it initiates for example a 802.11 fast roaming procedure.

At or after this point, the control signal K1 is set to level "0", after a predetermined amount of "overlap" time or when the detected LiFi signal becomes nearly zero. The first switch S1 is therefore controlled by K1 to switch to position 0. From that moment, the connection between the WiFi communication module 200 and the OFE 21 is disconnected and the user device operates in the WiFi mode.

In practice, the "overlap" time or delay between switching the second switch S2 to position 1 and switching the first switch S1 to position 0 may be set to a predetermined time, such as for example 100 ms, which is sufficient for the fast roaming procedure to finish.

Alternatively, the control signal K1 may be trigger by a further even lower threshold value for the strength of the optical LiFi signal detected by the signal strength detector 25. The same holds for a procedure of switching from the WiFi network to the LiFi network.

If position 0 of the switch S1 is connected to a further antenna 204, the WiFi chip 205 now operates with dual antenna. It is also possible to connect position 0 of S1 with a 50 Ohm terminator, leaving the WiFi chip to operate only one antenna.

On the other hand, when the user device enters a LiFi coverage area while still connecting to the WiFi network, the connection between the OFE of the LiFi connection module 20 with the WiFi communication module 200 is enabled before disconnecting the RF antenna(s).

Specifically, the strength of the optical LiFi signal detected by the signal strength detector 25 is above the threshold value. The signal strength detector 25 therefore outputs the control signal K1 "1" to switch the switch S1 to position 1. The connection port 201 of the WiFi communication module 200 is therefore connected to the OFE 21 while the connection port 202 of the WiFi communication module 200 is still connected to the RF antenna 203.

The WiFi chip 205 keeps being associated with the WiFi AP, while the fast roaming procedure is initiated to start associating with the LiFi AP.

When the user device is associated with the LiFi AP, the second switch S2 is controlled by the signal strength detector 25 to switch to position 0, which connects the connection port 202 to a 50 Ohm terminator, i.e., the WiFi signal receiving is completely disabled. This serves the purpose of enabling the WiFi chip 205 to detect WiFi/LiFi operating mode state transitions without extra signals connections between the LiFi and the WiFi communication modules.

As the user device is associated only with one AP at any time, the LiFi module 20 as proposed by the present disclosure can achieve a smooth handover between the LiFi and WiFi network, and seamless connectivity is thereby realized.

Figure 3:
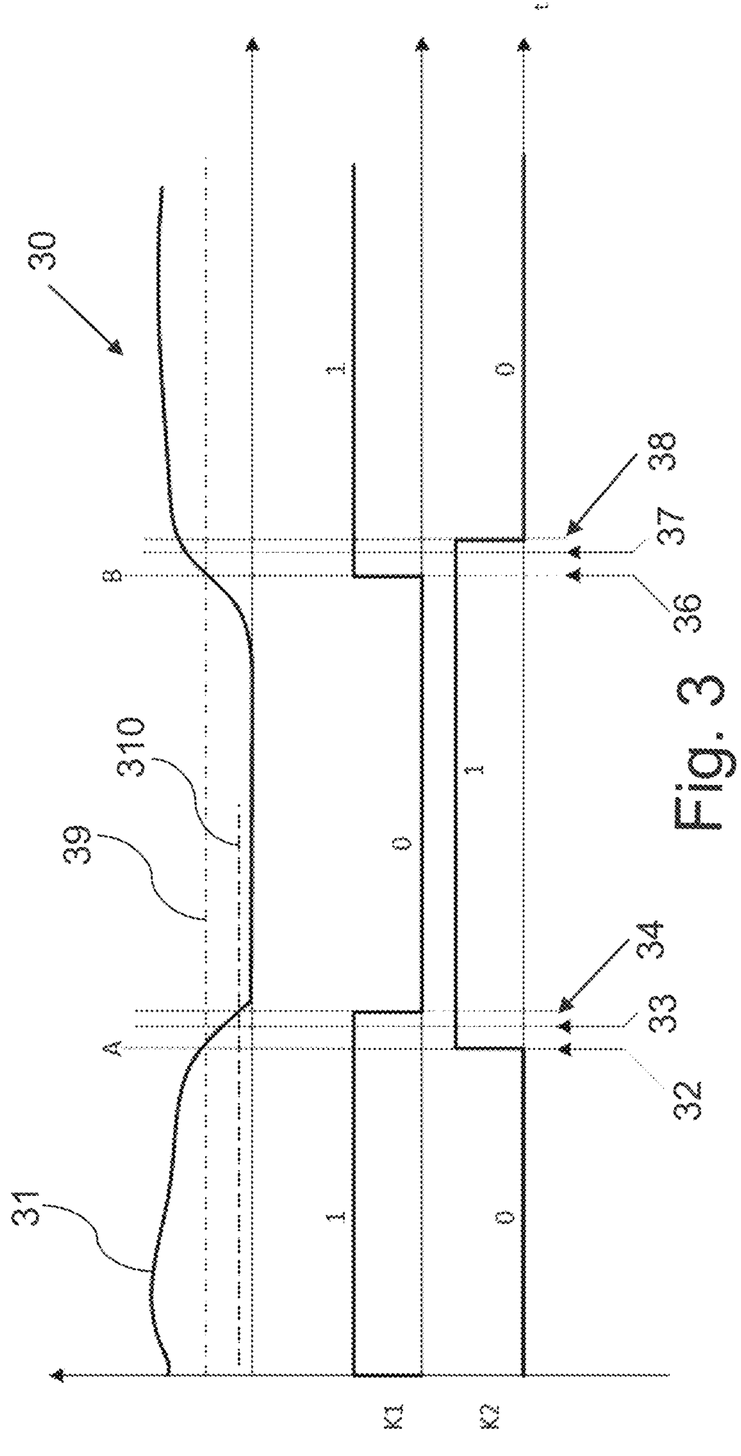
FIG. 3 is a schematic timing diagram illustrating control of switches to enable or disable the LiFi or WiFi network based on the detected strength of an optical signal.

FIG. 3 is a schematic timing diagram 30 illustrating control of switches S1 and S2 using control signals K1 and K2 to enable or disable the LiFi or WiFi network based on the detected strength of an optical signal.

A curve 31 represents the strength of the detected optical signal by the signal strength detector 25. At a time point A, the strength of the detected optical signal drops below a threshold value 39. The control signal K2 at this point 32 enables the switch S2 to connect the RF antenna to the WiFi communication module, which triggers the initiation of the fast roaming procedure to roam to the WiFi network.

At time point 33, the user device is connected to the WiFi network. Following that, at time point 34, the control signal K1 controls the switch S1 to disconnect the OFE from the WiFi communication module. As described above, a time period between 32 and 34 may be set to a predetermined value. Alternatively, the time point 34 may be determined by a further threshold value 310 which is lower than the first threshold 39.

On the other hand, at a time point B, the strength of the detected optical signal by the signal strength detector 25 is above the threshold value 39. At this point 36, the control signal K1 enables the switch S1 to connect the OFE to the WiFi communication module, which triggers the initiation of the fast roaming procedure to roam to the LiFi network.

At time point 37, the user device is connected to the LiFi AP. Following that, at time point 38, the control signal K2 controls the switch S2 to disconnect the RF antenna from the WiFi communication module and to connect the connection port 202 to a 50 Ohm terminator. Again a period of delay between 36 and 38 may be set to have a predetermined length. Alternatively, the time point 38 may be determined based on still a further threshold value (not show) which is higher than the first threshold value 39.

A method of initiating handover of a user device comprising the LiFi module of the present disclosure between a WiFi network and a LiFi network will be detailed in the following.

IEEE 802.11r provides two method of roaming: Over-the-Air and Over-the-DS (Distribution System). For the sake of completeness, an over-the-air message exchange procedure according to IEEE, "Wireless LAN Medium Access Control (MAC) and Physical Layer (PHY) Specifications," IEEE, 2016 is described briefly in the following. In all fast roaming processed the FT Originator, FTO, is the client.

A FTO is initially attached to a current AP in a secure session and performing data transmission when it determines that it needs to transition to a target AP. The FTO then sends a 802.11 Authentication-Request to a target AP and receives from a target AP an Authentication-Response. Following that, a Reassociation request is sent from the FTO to the target AP, which may be followed with a Reassociation Response from the target AP to the FTO. A successful reassociation occurs when a time between the Authentication-Request and a Reassociation request does not exceed the Reassociation Deadline Time. When the reassociation is successful, a 802.1X controlled Port is unblocked, successfully (secure) session and data transmission may be performed.

For successful fast roaming to be conducted, the WiFi chip in the user device keeps a record of neighbor APs and knows the moment of transition when it starts to see both WiFi and LiFi APs. The user device then decides to handover to the new AP immediately.

To distinguish between WiFi and LiFi APs, during the installation phase, LiFi APs are given special code in their beacon frame such that the user device can always distinguish between the WiFi AP and the LiFi AP. With this information, the user device knows the exact moment that it needs to trigger the fast roaming procedure.

Figure 4:
FIG. 4 schematically illustrates 802.11 beacon frame.

A special code for identifying a LiFi AP can be for instance implemented in Vender Specific field in the 802.11 beacon frame as illustrated in FIG. 4, or any other convenient field of the beacon frame. In this way the user device will know whether an AP is a WiFi or LiFi AP after decoding the beacon frame.

Figure 5:
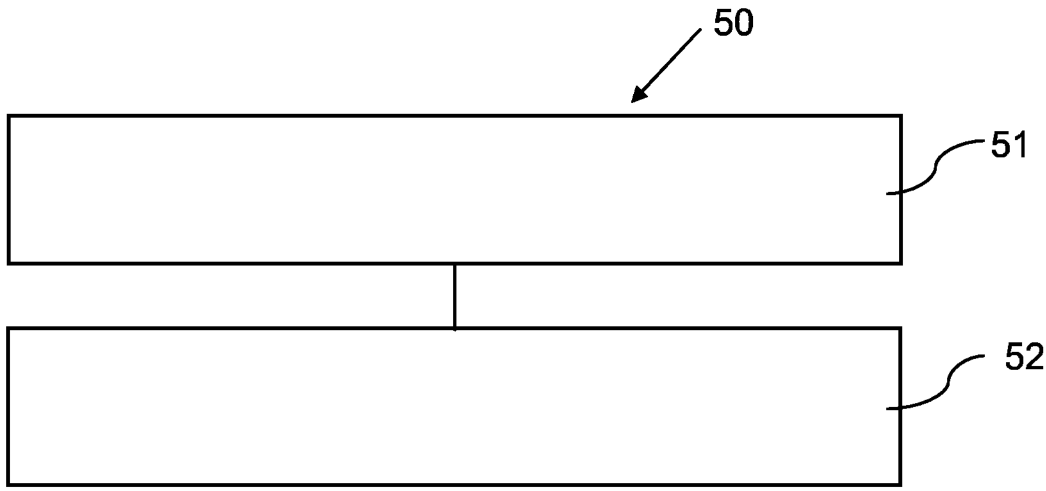
FIG. 5 schematically illustrates, in a flow chart type diagram, a method of initiating handover of a user device comprising the LiFi module of the present disclosure between a WiFi network and a LiFi network.

FIG. 5 schematically illustrates, in a flow chart type diagram, a method 50 of initiating handover of a user device comprising the LiFi module of the present disclosure between a WiFi network and a LiFi network.

There is no direct communication between the LiFi module of the present disclosure and the WiFi chip, except for the two connection ports of the WiFi communication module.

The method 50 allows the WiFi chip to know when the switching actions, that is, transition moments of K1, K2 indicated by “A” and “B” in FIG. 3 take place, and thereby to initiate fast roaming at the right moment.

At step 51, the WiFi chip detects a state change at one of the connection ports of the WiFi communication module.

This may comprise the WiFi chip detecting that the RF antenna being connected to the connection port 202 or the OFE being connected to the connection port 201, of the WiFi communication module.

In one example, the user device performs network scan in a conventional way to get to know APs are in its communication range. Once the user device “sees” a LiFi AP, that is, the user device can be connected or attached to the LiFi AP, the user device will connect to the LiFi AP.

At this operation state, the RF antenna will be disabled under control of the LiFi signal strength detector, by way of the control signals K1 and K2. Therefore, the WiFi chip will not be able to see a WiFi AP, though physically it may still be within the WiFi coverage area.

Once the user device moves close to an edge of the LiFi coverage area, the LiFi signal detector enables the connection of the RF antenna to the connection port 202. The WiFi chip at this moment notices that an WiFi AP is within its communication range as WiFi beacon messages are now received at the connection port 202 of the WiFi communication module.

This state change allows the WiFi chip to see both the LiFi and the WiFi APs at the same time, as there is still active data communicate between the connection port and the OFE. The state change is a direct consequence of the action of the LiFi signal strength detector (changes K2 from “0” to “1”). This state change will be used by the WiFi chip as a trigger to initiate fast roaming procedure and handover to WiFi network at a next step.

At step 52, the WiFi chip initiates handover from the LiFi network to the WiFi network by using a fast roaming procedure.

The fast roaming procedure is very fast and is accomplished typically in around 40 ms. It is expected the user device is already associated with WiFi AP before the LiFi signal is completely lost.

In another example, the user enters a LiFi zone while it is still associated with the WiFi AP. At this moment, the LiFi signal detector changes the control signal K1 to “1” at moment “B” (see FIG. 3). This allows the WiFi chip to notice or detect a state change (step 51) since it now can see both the WiFi and LiFi APs. This state change is used as a trigger to handover to LiFi network via the fast roaming procedure.

Thereafter, the WiFi chip initiates handover from the WiFi network to the LiFi network by using the fast roaming procedure (step 52).

This procedure is less time critical than LiFi-WiFi handover because the WiFi signal will remain available in the LiFi zone so the transition can take place slowly, if desired.

The signal K1 may be further utilized to turn-off the OFE TX circuit for power saving when the user device is outside LiFi coverage.

To avoid frequent transition or mis-detect by the LiFi signal strength detector, a signal quality assessment circuit makes sure only to switch to optical medium when the signals as received by the OFE is of sufficient connection quality, for example, being above a defined signal noise ratio, SNR, or RSSI threshold.

This can be realized with a well-thought threshold value as shown in FIG. 3, and possibly in combination with hysteresis, to avoid frequent switching between LiFi-WiFi when the user device is stationary positioned near the edge of the LiFi coverage, The hysteresis can be implemented with two different threshold values (not shown in FIG. 3), e.g., a higher threshold for moment A than for moment B (instead of using a same threshold).

In a real life application scenario, it is assumed that a user device present in a LAN with both WiFi and LiFi networks, upon start up, will be connected to the WiFi network by default. Since there is no direct communication between the LiFi module and the WiFi chip in the user device, except for the two antenna ports of the WiFi chip, the method as described above is used to let the WiFi chip start roaming as soon as the LiFi signal strength detection change the state (in the coverage area or outside the coverage).

Figure 6:
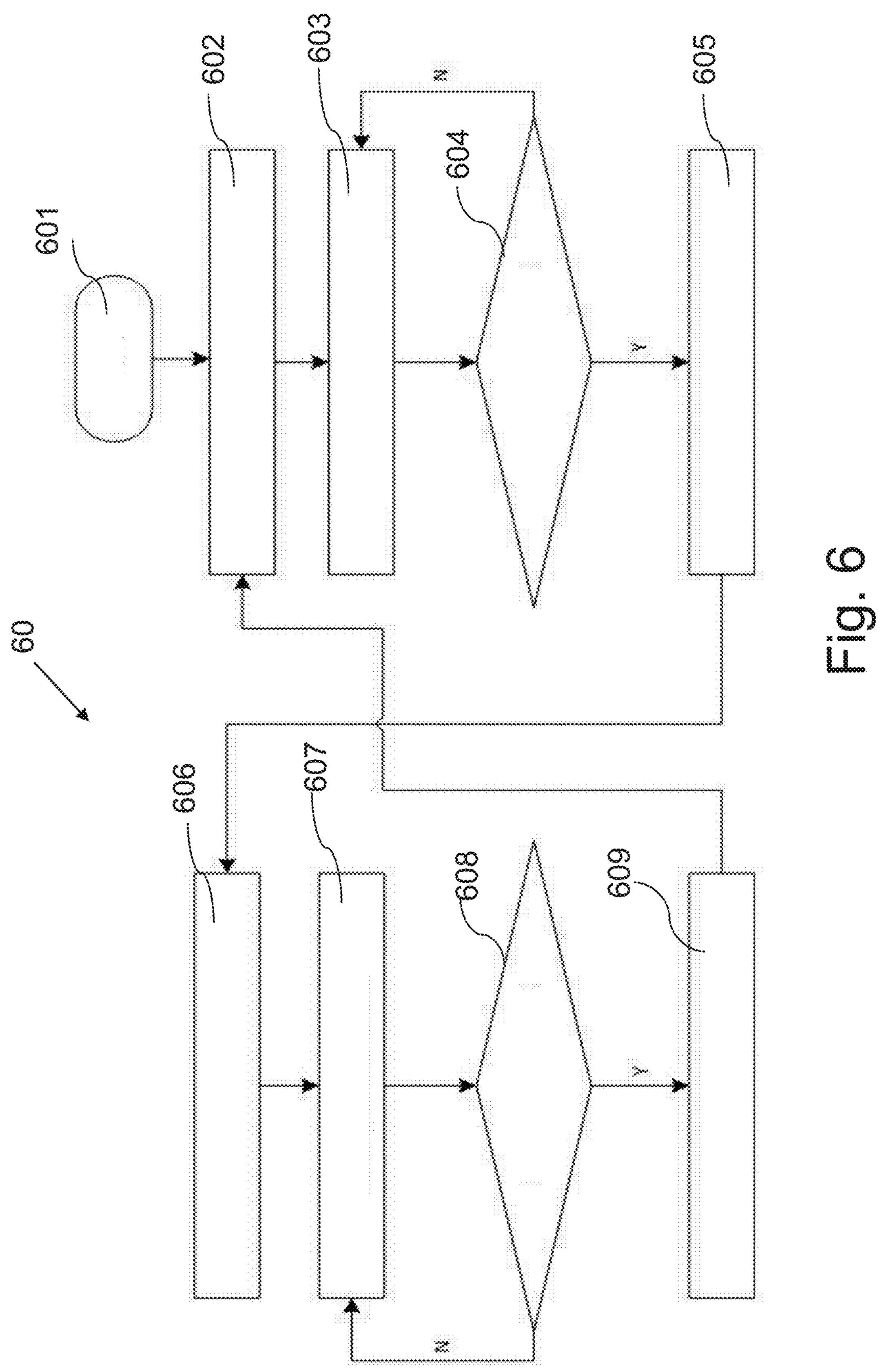
FIG. 6 schematically illustrates a complete operating procedure making use of the method of FIG. 5 by a user device or EP.

FIG. 6 schematically illustrates a complete operating procedure 60 making use of the above method by a user device or EP.

After start at step 601 such as by powering up the user device, it is connected with the WiFi AP at step 602. While still connecting to the WiFi AP, the EP performances network scan at step 603, this is commonly implemented in WiFi devices to know which APs are in the range.

As soon as the user device sees a LiFi AP within reach at step 604, it will initiate a fast roaming procedure at step 605 to connect to the LiFi AP at step 606.

When this happens, the RF antenna 203 will be disabled by the LiFi signal strength detector circuit (K1, K2). In this operating state, the WiFi chip will not be able to see a WiFi AP, though physically it is still within the WiFi coverage, as both RF antennas are disconnected.

While connecting to the LiFi AP, once the user moves near an edge of the LiFi coverage, the LiFi signal detector enables the RF antenna 203 (K2 goes high “1” at moment 32, see FIG. 3). When the EP scans the network 607, its WiFi chip will then notice there is an WiFi AP it can reach in 608. At this time, the WiFi beacon is received via port 202, while active data communicate is still going via port 201 which is connected to the OFE.

This state change is used as a trigger to initiate fast roaming procedure 609 and handover to WiFi network 602. And this state change, that is now seeing both the LiFi and WiFi APs, is a direct consequence of the action of the LiFi signal strength detector (changes K2 from “0” to “1”).

In another scenario, when the user device enters a LiFi zone while still associated with the WiFi network, the WiFi chip will notice a state change since it now can see both WiFi and LiFi APs. This is because the LiFi signal detector changes K1 to “1” at moment 36, see FIG. 3.

This state change is used as a trigger to handover to the LiFi network via the fast roaming procedure. This procedure is less time critical than LiFi-WiFi handover because the WiFi signal will remain available in the LiFi zone so the transition can take place slowly, if desired.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A LiFi module for operatively connecting to a WiFi communication module supporting both Wi-Fi and Li-Fi connections, the LiFi module comprising an optical front end, OFE, for transmitting and receiving data via an optical medium and a connection circuit for communicatively connecting the OFE to the WiFi communication module, the connection circuit comprising:

a switching component comprising a first switch configured to enable or disable connection between the OFE and the WiFi communication module and a second switch configured to enable or disable the connection between the WiFi communication module and a radio frequency, RF, antenna; and a LiFi signal strength detector electrically connected to the switching component and a receive path of the OFE and configured to control the switching component based on a detected strength of an optical signal received at the receive path of the OFE;

wherein a control terminal of the first switch being connected to a first output terminal of the LiFi signal strength detector, and a control terminal of the second switch being connected to a second output terminal of the LiFi signal strength detector.

2. The LiFi module according to claim 1, wherein:

the LiFi signal strength detector is configured to output an enabling signal at its second output signal and then to output a disabling signal at its first output terminal after a period of delay, when the detected strength of the optical signal is lower than a threshold value;

the first switch is configured to disable the connection between the OFE and the WiFi communication module, in response to the disabling signal received; and the second switch is configured to enable a connection between the WiFi communication module and a radio frequency, RF, antenna, in response to the enabling signal received.

3. The LiFi module according to claim 1, wherein:

the LiFi signal strength detector is configured to output an enabling signal at its first output terminal and then to output a disabling signal at its second output signal after a period of delay, when the detected strength of the optical signal is higher than a threshold value;

the first switch is configured to enable the connection between the OFE and the WiFi communication module, in response to the enabling signal received; and the second switch is configured to disable a connection between the WiFi communication module and a RF antenna and to enable a connection between the WiFi communication module and a terminator in response to the disabling signal received.

4. The LiFi module according to claim 1, wherein the first switch and the second switch are single pole double throw switches.

5. The LiFi module according to claim 1, further comprising a RF-LiFi converter connected between the OFE and the first switch of the connection module and configured to perform frequency conversion between RF band and LiFi optical baseband.

6. The LiFi module according to claim 5, further comprising a third switch connected between the RF-LiFi converter and the first switch of the connection module and configured to separate transmit and receive signals from the WiFi communication module.

7. A wireless communication module arranged for providing network service to both a WiFi network and a LiFi network connected to a same LAN, comprising the LiFi module according to claim 1 and a WiFi communication module operatively connected to the LiFi module and supporting both WiFi and LiFi connections, the WiFi communication module comprising a first connection port and a second port, the second connection port arranged for being switched between a RF antenna and a terminator, the first connection port arranged for being switched between the OFE of the LiFi module and a second RF antenna or a terminator, under control of the LiFi signal strength detector of the LiFi module.

8. A method of initiating handover of a user device between a WiFi network and a LiFi network both connectable to the user device and both connected to a same Local Area Network, LAN, the user device comprising a LiFi module the LiFi module comprising an optical front end, OFE, for transmitting and receiving data via an optical medium and a connection circuit for communicatively connecting the OFE to the WiFi communication module, the connection circuit comprising:

a switching component comprising a first switch configured to enable or disable connection between the OFE and the WiFi communication module and a second switch configured to enable or disable the connection between the WiFi communication module and a radio frequency, RF, antenna; and a LiFi signal strength detector electrically connected to the switching component and a receive path of the OFE and configured to control the switching component based on a detected strength of an optical signal received at the receive path of the OFE;

wherein a control terminal of the first switch being connected to a first output terminal of the LiFi signal strength detector, and a control terminal of the second switch being connected to a second output terminal of the LiFi signal strength detector, and the user device further comprising a WiFi communication module supporting WiFi and LiFi connections respectively at two connection ports, the method performed by a control software route of the WiFi communication module of the user device and comprising:

detecting a state change at one of the connection ports of the WiFi communication module; and initiating handover between the WiFi network and the LiFi network by using a roaming procedure.

9. The method according to claim 8, wherein the user device is connected to the LiFi network:

the step of detecting comprises detecting that a WiFi beacon message is received at a second connection port of the WiFi communication module; and the step of initiating comprises initiating handover from the LiFi network to the WiFi network.

10. The method according to claim 9, wherein a WiFi beacon message is received at a second connection port of the WiFi communication module as a result of a connection between the second connection port of the WiFi communication module and a RF antenna being enabled, in response to an enabling signal received at a control terminal of the second switch from the second output terminal of the LiFi signal strength detector of the LiFi module.

11. The method according to claim 9, wherein an indicator is comprised in the WiFi beacon message to distinguish between the WiFi network and the LiFi network.

12. The method according to claim 8, wherein the user device is connected to the WiFi network:

the step of detecting comprises detecting that a LiFi beacon message is received at a first connection port of the WiFi communication module; and the step of initiating comprises initiating handover from the WiFi network to the LiFi network.

13. The method according claim 12, wherein a LiFi beacon message is received at a first connection port of the WiFi communication module as a result of a connection between the first connection port of the WiFi communication module and the OFE being enabled, in response to an enabling signal received at a control terminal of the first switch from the first output terminal of the LiFi signal strength detector of the LiFi module.

14. The method according to claim 12, wherein an indicator is comprised in the LiFi message to distinguish between the Wifi network and the LiFi network.

15. A non-transitory computer readable storage medium storing instructions which, when executed on at least one processor, cause said at least one processor to carry out the method according to claim 8.

* * * * *